(12) United States Patent
Bacic et al.

(10) Patent No.: US 8,688,245 B2
(45) Date of Patent: Apr. 1, 2014

(54) SYSTEM CONTROL

(75) Inventors: Marko Bacic, Abthorpe (GB); Leo V Lewis, Kenilworth (GB)

(73) Assignee: Rolls-Royce PLC, London (GB)

( * ) Notice: Subject to any disclaimer, the term of this patent is extended or adjusted under 35 U.S.C. 154(b) by 287 days.

(21) Appl. No.: 13/176,423

(22) Filed: Jul. 5, 2011

(65) Prior Publication Data
US 2012/0022838 A1 Jan. 26, 2012

(30) Foreign Application Priority Data
Jul. 26, 2010 (GB) .................................. 1012442.8

(51) Int. Cl.
G05B 13/02 (2006.01)
G05B 13/04 (2006.01)

(52) U.S. Cl.
CPC ............ *G05B 13/041* (2013.01); *G05B 13/048* (2013.01)
USPC .......................................................... 700/36

(58) Field of Classification Search
CPC . G05B 13/048; G05B 13/041; G05B 23/0297
USPC .......................................................... 700/36
See application file for complete search history.

(56) References Cited

U.S. PATENT DOCUMENTS

| | | | | |
|---|---|---|---|---|
| 4,881,172 | A * | 11/1989 | Miller | 701/37 |
| 5,750,897 | A * | 5/1998 | Kato | 73/663 |
| 7,058,552 | B2 * | 6/2006 | Stothert et al. | 703/2 |
| 7,206,644 | B2 * | 4/2007 | Iino et al. | 700/36 |

(Continued)

FOREIGN PATENT DOCUMENTS

| | | | | |
|---|---|---|---|---|
| EP | 0 275 664 | A1 | 7/1988 | |
| EP | 275664 | A1 * | 7/1988 | ............ G05B 13/04 |

(Continued)

OTHER PUBLICATIONS

Rawlings, James B., "Tutorial: Model Predictive Control Technology," *Proceedings of the American Control Conference*, vol. 1, San Diego, California, USA, Jun. 2-4, 1999, pp. 662-676.

(Continued)

*Primary Examiner* — Mohammad Ali
*Assistant Examiner* — Sivalingham Sivanesan
(74) *Attorney, Agent, or Firm* — Oliff PLC

(57) ABSTRACT

A method of controlling a system that has a finite execution time in the optimization of a cost function:

$$J = \sum_{i=1}^{N} F(u(k+i|k), y(k+i|k)),$$

where N is selected such that J is convergent; k+i is the time in the future after the passage of i time increments; u(k+i|k) and y(k+i|k) are restricted to values of the respective control variables u and performance variables y that are compatible with predetermined system operational constraints; and for each time increment i=1 ... N, values for F(u(k+i|k), y(k+i|k)) are calculated using a system model M to determine y(k+i|k) for a plurality of respective discrete values of u(k+i|k) that are limited to and representatively sampling the range of possible values of u that are compatible with the predetermined system operational constraints, J being optimised by identifying the combination {u(k+1|k),u(k+2|k), ... u(k+N|k)} of respective discrete values u(k+i|k) over N time increments that combination yields an optimised value for J.

12 Claims, 4 Drawing Sheets

(56) References Cited

U.S. PATENT DOCUMENTS

| | | | | |
|---|---|---|---|---|
| 2006/0282177 | A1* | 12/2006 | Fuller et al. | 700/28 |
| 2007/0250215 | A1* | 10/2007 | Jia et al. | 700/274 |
| 2010/0332475 | A1* | 12/2010 | Birdwell et al. | 707/737 |

FOREIGN PATENT DOCUMENTS

| | | | | |
|---|---|---|---|---|
| EP | 1 315 053 | A2 | 5/2003 | |
| EP | 1315053 | A2 * | 5/2003 | G05B 13/02 |
| EP | 1 538 319 | A1 | 6/2005 | |
| EP | 1538319 | A1 * | 6/2005 | F02C 9/00 |
| GB | 2 417 762 | A | 3/2006 | |

OTHER PUBLICATIONS

Cannon, Mark, "Efficient nonlinear model predictive control algorithms," *Annual Reviews in Control*, vol. 28, No. 2, Jan. 1, 2004, pp. 229-237.

European Search Report issued in Application No. 11 17 2719; Dated Nov. 16, 2011.

Great Britain Search Report issued in British Application No. 1012442.8 dated Nov. 23, 2010.

Cormen et al., *Introduction to Algorithms, Second Edition*, 2001, Chapter 24: Single-Source Shortest Paths, Chapter 25: All-Pairs, Shortest Paths, pp. 580-599, 607-613, and 636-640, McGraw-Hill Book Company.

\* cited by examiner

SYSTEM CONTROL

FIELD OF THE INVENTION

The present invention relates to a method of controlling and a controller for a system, such as a gas turbine engine.

BACKGROUND OF THE INVENTION

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Engine operating conditions vary throughout a flight as e.g. ambient temperature, pressure, Mach number and power output level vary. Variation of any of these conditions can cause the engine dynamics to respond in a significantly nonlinear manner. Further, it is also necessary to ensure that the engine operates safely within its own limits. Thus an aim of engine control is thus to obtain optimum engine efficiency for a given operating condition while respecting operational constraints.

Modern engines are based on digital electronics, the collection of control system elements often being referred to as a Full Authority Digital Electronic Controller (FADEC). At the heart of the FADEC is an Engine Electronic Controller (EEC). The EEC receives measurements from onboard sensors, the measurements providing data on engine performance variables, such as gas pressures and temperatures, and on engine state variables, such as rotor speeds and metal temperatures. The EEC then uses these measurements to determine values for engine control variables, such as fuel flow, valve positions, inlet guide vane position, in accordance with a desired power output, but while staying within operational constraints. Although the engine may display nonlinear behaviour, the EEC can seek to achieve optimum values for the engine control variables on the basis, for example, of numerous linear controllers acting in concert.

While this approach has been applied successfully, engine control closer to the optimum may be obtained by the application of predictive control methodologies which take better account of engine nonlinearities.

For example, US 2006/0282177 proposes using quadratic programming for predictive control. More particularly, an algorithm is proposed that provides an interior point method for real-time implementation. The basic method comprises: linearizing a nonlinear model of a gas turbine engine, formulating the quadratic programming problem, solving the problem using the interior point method to compute the control action, and executing the control action.

EP 1538319 describes the application of nonlinear predictive control for a gas turbine application where the aim is to minimize a certain performance index. However, unlike US 2006/0282177, EP 1538319 utilizes a reduced order nonlinear model of a gas turbine engine. To avoid using nonlinear programming, the cost to be optimised is modified to include an exponential term that produces a high penalty when the predicted actuator commands and engine states are near their operating limits. This ensures that the choice of control inputs does not violate engine constraints. To minimize the cost, the patent makes use of an iterative gradient descent approach. As the reduced nonlinear model needs to know the state the engine is in (i.e. all pressures, temperatures etc.) a Kalman filter is used to estimate the unmeasured states from the measured outputs available from the sensors on the engine.

A disadvantage of US 2006/0282177 is its reliance on quadratic programming. Although quadratic programming is guaranteed to converge from a theoretical viewpoint, it is an iterative procedure without a bound on the number of steps required to reach a solution. Therefore implementation of such a controller in a real-time environment for an aerospace gas turbine application presents challenges due to the non-deterministic end time. If the algorithm does not converge by a given set time, then the controller has to use whatever solution has been reached by that time. This solution is likely to be sub-optimal, may even not be feasible, and could potentially lead to instability. Thus a controller based on the US 2006/0282177 faces significant certification challenges.

The scheme presented in EP 1538319 also suffers from the disadvantage raised above, as it still relies on an iterative algorithm—albeit a simpler one. In addition, EP 1538319 relies on the extended Kalman filter, which can also suffer from non-convergence issues. Such a scheme would require significant amounts of tuning and would lead to certification challenges due to the non-deterministic end time.

SUMMARY OF THE INVENTION

The present invention seeks to address disadvantages in the above approaches, and in particular aims to provide a method of controlling a system, such as a gas turbine engine, which has a guarantee of a finite execution time (e.g. a countable number of execution steps) in the optimisation of an appropriate cost function.

Accordingly, a first aspect of the present invention provides a method of controlling a system, the method comprising the steps of:

(a) providing a system model M which is in explicit form and which predicts one or more system performance variables y from one or more system control variables u, such that $y(k+1|k) = M \circ u(k+1|k)$, where k is the present time, and k+1 is the time in the future after the passage of a time increment of predetermined length;

(b) at time k, measuring or estimating the present values of the performance variables y, and then using a deterministic algorithm to optimise a cost function:

$$J = \sum_{i=1}^{N} F(u(k+i|k), y(k+i|k)),$$

where:
  N is selected such that the cost function J is convergent,
  k+i is the time in the future after the passage of i of the time increments,
  u(k+i|k) and y(k+i|k) are restricted in the cost function J to values of the respective control variables u and performance variables y which are compatible with predetermined system operational constraints, and
  for each time increment i=1 ... N, values for F(u(k+i|k),y(k+i|k)) are calculated using the system model M to determine y(k+i|k) for a plurality of is respective discrete values of u(k+i|k), the discrete values being limited to and representatively sampling the range of possible values of u which are compatible with the predetermined system operational constraints, the cost function J being optimised by identifying the combination {u(k+1|k),u(k+2|k), ... u(k+N|k)} of respective discrete values u(k+i|k) over the N time increments which combination yields an optimised value for J;
(c) selecting values for the control variables u which correspond to u(k+1|k) in the identified combination {u(k+1|k),u(k+2|k), ... u(k+N|k)};
(d) at time k+1, controlling the system with the selected values for the control variables u; and
(e) repeatedly performing steps (b) to (d), time k+1 becoming the new time k after each performance of step (d).

Advantageously, by specifying a system model M which is in explicit form, and by applying a deterministic algorithm in step (b), steps (b) to (d) can always be performed within a specified number of execution steps. This makes the method suitable for implementation in a system controller as a guarantee of a finite execution time for the performance of steps (b) to (d) can be provided.

Further, by limiting the discrete values of the control variables u to those which are compatible with the predetermined system operational constraints, the values selected for u at step (c) can always be feasible. For example: in the case of an inlet guide vane position, u can be limited to values in the range of allowed vane angles; in the case of an on/off valve, u can be limited to the values 0 and 1; and in the case of a continuously variable valve, u can be limited to values in the range from 0 to 1.

The method may have any one or, to the extent that they are compatible, any combination of the following optional features.

The system can be a power plant, such as a gas turbine engine.

Typically, the optimisation of the cost function J is a minimisation of J.

The cost function J may be any continuous real function. However, conveniently, J can be a quadratic function in the variables u and y. For example, one option is to have $F(u,y) = Ru^2 + Qy^2$ where R and Q are weighting factors.

u and y are typically vectors specifying the values of a plurality of respective control and performance variables. Thus, as the skilled person would recognise, the above expression for F(u,y) includes $F(u,y) = u^T R u + y^T Q y$.

The system model M can be a linear function of past inputs and outputs, e.g.:

$$y(k+1|k) = \sum_{i=0}^{Q} \alpha_i y(k-i) + \sum_{j=0}^{Q} \beta_j u(k+1-j)$$

or a non-linear function, e.g.:

$$y(k+1|k) = \sum_{i=0}^{Q} \alpha_i y(k-i)^p + \sum_{j=0}^{Q} \beta_j u(k+1-j)^q$$

where $\alpha_i$, $\beta_j$, p and q are constants (and either or both of p and q not being equal to 1), but must be in explicit form so that iteration is not required to determine y(k+i|k) in step (b).

In the context of the control and modelling of a gas turbine engine, the control variables u can be, for example: variable stator vane actuator demands, turbine case cooling valve demands, bleed valve demands, fuel flow demands, or others.

Again in the context of the control and modelling of a gas turbine engine, the performance variables y can be, for example: compressor surge margin estimates, tip clearances, temperatures, pressures, mass flows. Combinations of different types of such variables may be required.

In addition to the one or more control variables u, the system model M may also predict the one or more performance variables y from one or more system state variables which are not used in the cost function. Such state variables can be, for example, further temperatures, pressures, and/or mass flows.

At step (b), the present values of the state variables x may be measured or estimated.

Preferably, at step (b), the deterministic algorithm is the Dijkstra algorithm, although alternative deterministic algorithms are known to the skilled person. For example, suitable graph theoretical algorithms are described in Thomas H. Cormen, Charles E. Leiserson, Ronald L. Rivest, and Clifford Stein, *Introduction to Algorithms*, Second Edition. MIT Press and McGraw-Hill, 2001, ISBN 0-262-03293-7.

A second aspect of the invention provides a controller for performing the method of the first aspect. For example, a controller for controlling a system is provided, the controller being arranged to perform the steps of:
(a) providing a system model M which is in explicit form and which predicts one or more system performance variables y from one or more system control variables u, such that y(k+1|k)=M∘u(k+1|k), where k is the present time, and k+1 is the time in the future after the passage of a time increment of predetermined length;
(b) receiving measurements of or estimating, at time k, the present values of the performance variables y, and then using a deterministic algorithm to optimise a cost function:

$$J = \sum_{i=1}^{N} F(u(k+i|k), y(k+i|k)),$$

where:
  N is selected such that the cost function J is convergent,
  k+i is the time in the future after the passage of i of the time increments,
  u(k+i|k) and y(k+i|k) are restricted in the cost function J to values of the respective control variables u and performance variables y which are compatible with predetermined system operational constraints, and for each time increment i=1 ... N, values for F(u(k+i|k),y(k+i|k)) are calculated using the system model M to determine y(k+i|k) for a plurality of respective discrete values of u(k+i|k), the discrete values being limited to and representatively sampling the range of possible values of u which are compatible with the predetermined system operational constraints, the cost function J being optimised by identifying the combination {u(k+1|k),u(k+2|k), ... u(k+N|k)} of respective discrete values u(k+i|k) over the N time increments which combination yields an optimised value for J;

(c) selecting values for the control variables u which correspond to u(k+1|k) in the identified combination {u(k+1|k),u(k+2|k), ... u(k+N|k)};

(d) at time k+1, controlling the system with the selected values for the control variables u; and (e) repeatedly performing steps (b) to (d), time k+1 becoming the new time k after each performance of step (d).

The controller may have one or more optional features corresponding to optional features of the method of the first aspect.

The controller typically comprises one or more processors, one or more memory devices, and other hardware devices suitably arranged to perform the steps. For example, the system model M can be stored on a memory device. The same or different memory devices can be used to store measurements of the present values of the performance variables y. The one or more processors can be used to estimate present values of the performance variables y, perform the deterministic algorithm, and/or select values for the control variables u. The controller typically has input and output devices for respectively receiving measurements and issuing the selected values for the control variables u.

The controller can be an engine electronic controller. Indeed, a further aspect of the invention provides a gas turbine engine having such an engine electronic controller.

BRIEF DESCRIPTION OF THE DRAWINGS

Embodiments of the invention will now be described by way of example with reference to the accompanying drawings in which.

DETAILED DESCRIPTION

Figure 1:
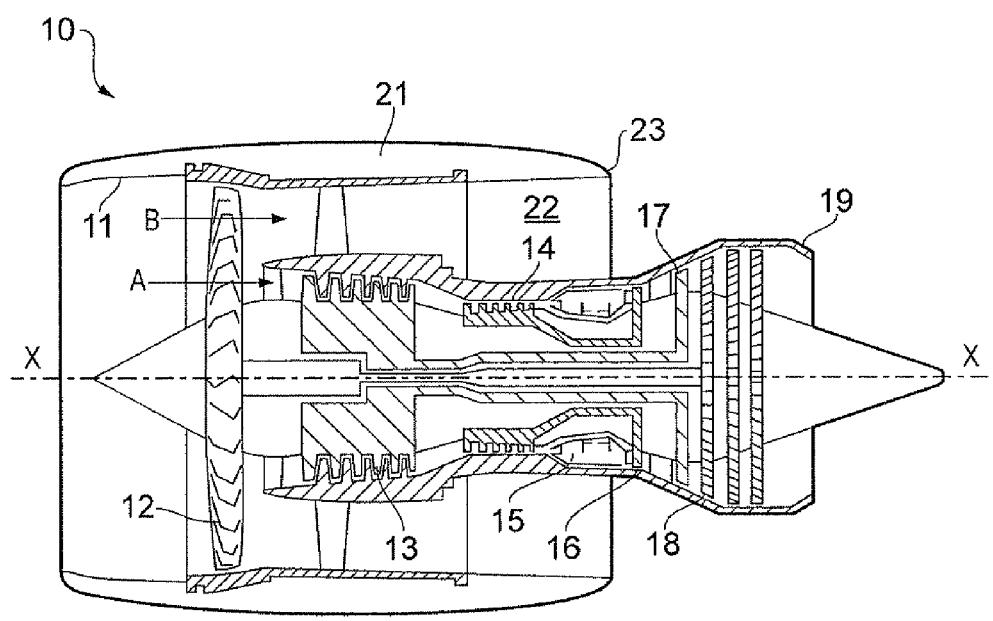
FIG. 1 shows schematically a longitudinal cross-section through a ducted fan gas turbine engine.
Figure 2:
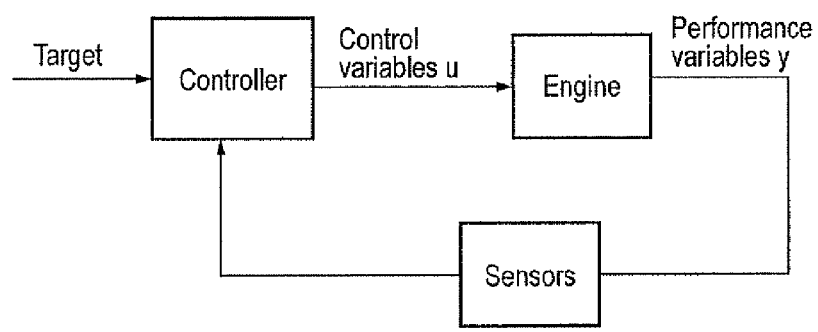
FIG. 2 shows a flow chart of the control loop for a gas turbine engine controller.

FIG. 2 shows a flow chart of the control loop for a gas turbine engine controller according to the present invention. A target operating condition (e.g. power output level) is sent to the controller, which determines optimised updated values for a plurality of engine control variables to be sent to the engine in order to arrive at the target operating condition. The determination makes use of an engine model, the present values of the engine control variables and present measured values of engine performance variables. In the engine, the updated control variables and/or changes to the external operating conditions of the engine affect the values of the engine performance variables. These values are measured directly or indirectly by engine sensors and the measurements are returned to the controller. The loop then repeats itself to provide further updates for the control variables.

The optimised updated control variables are required at regular time steps. Thus, at each loop, the determination of the optimised updated values for the control variables is performed using a predictive control strategy, but within a finite execution time, i.e. there is a limit on the number of steps in the optimisation. The risk of the optimisation being cut short, and non-optimal control variables being returned, can thus be eliminated.

Central to the predictive control strategy is the objective cost function, which in most cases is expressed as a quadratic cost function. Typically, the task of the optimisation is to minimise this function at each time step.

The engine model M, which needs to be in explicit form to provide a finite execution time, predicts the performance variables y from the control variables u, such that y(k+1|k)=M∘u(k+1|k), where k is the present time, and k+1 is the time in the future after the passage of a time increment of predetermined length. Thus u(k+1|k) denotes the inputs to the engine at time k+1 predicted at time k, and y(k+1|k) denotes the outputs to the engine at time k+1, given the inputs u(k+1|k), predicted at time k. For example, in one embodiment, the model M represents the relationship between the amount of fuel (control variable) put into a turbine and the spool speed (performance variable) of the turbine. In a blade tip clearance control embodiment, in which a flow of cooling air effects engine casing segment contraction and hence blade tip clearance, M could represent the relationship between a cooling air valve opening angle (control variable) and the tip clearance (performance variable).

In general terms, the predictive control strategy can be expressed as:

1. At sample instant k, and for a given plant model M, present control variables u and present (measured or estimated) performance variables y, choose an input trajectory u(k+i|k), where i=1 ... N, such that the corresponding predicted outputs y(k+i|k) minimise a cost function $$J = \sum_{i=1}^{N} F(u(k+i\mid k), y(k+i\mid k)),$$

whilst at the same time ensuring that u(k+i|k) and y(k+i|k) are within specified operational constraints (e.g. a valve cannot open more than 100% or less than 0%, or a tip clearance stays between maximum and minimum limits), i being the number of time increments up to a maximum of N after the present time.

2. Select u(k+1|k) from the chosen input trajectory and update the controller output to have the values of u(k+1|k) so that at time k+1 the engine receives the updated control variables.

3. k=k+1; go to 1

In order to perform step 1 efficiently and robustly, the allowable control moves u∈[$u_{min}$,$u_{max}$] are discretized between upper and lower limits with a sufficiently fine grid such that the available set of control moves at any time is:

$$u \in \{u_{min}, u_{min}+\delta, u_{min}+2\delta \ldots u_{min}+p\delta \ldots u_{max}-2\delta, u_{max}-\delta, u_{max}\}$$

Thus at time k, the choice for u(k+1|k) is one of the choices from the above set. Similarly, for each subsequent time instant u(k+2|k), u(k+3|k) etc. in the cost function J we have the same set of available inputs within input constraints.

Figure 3:
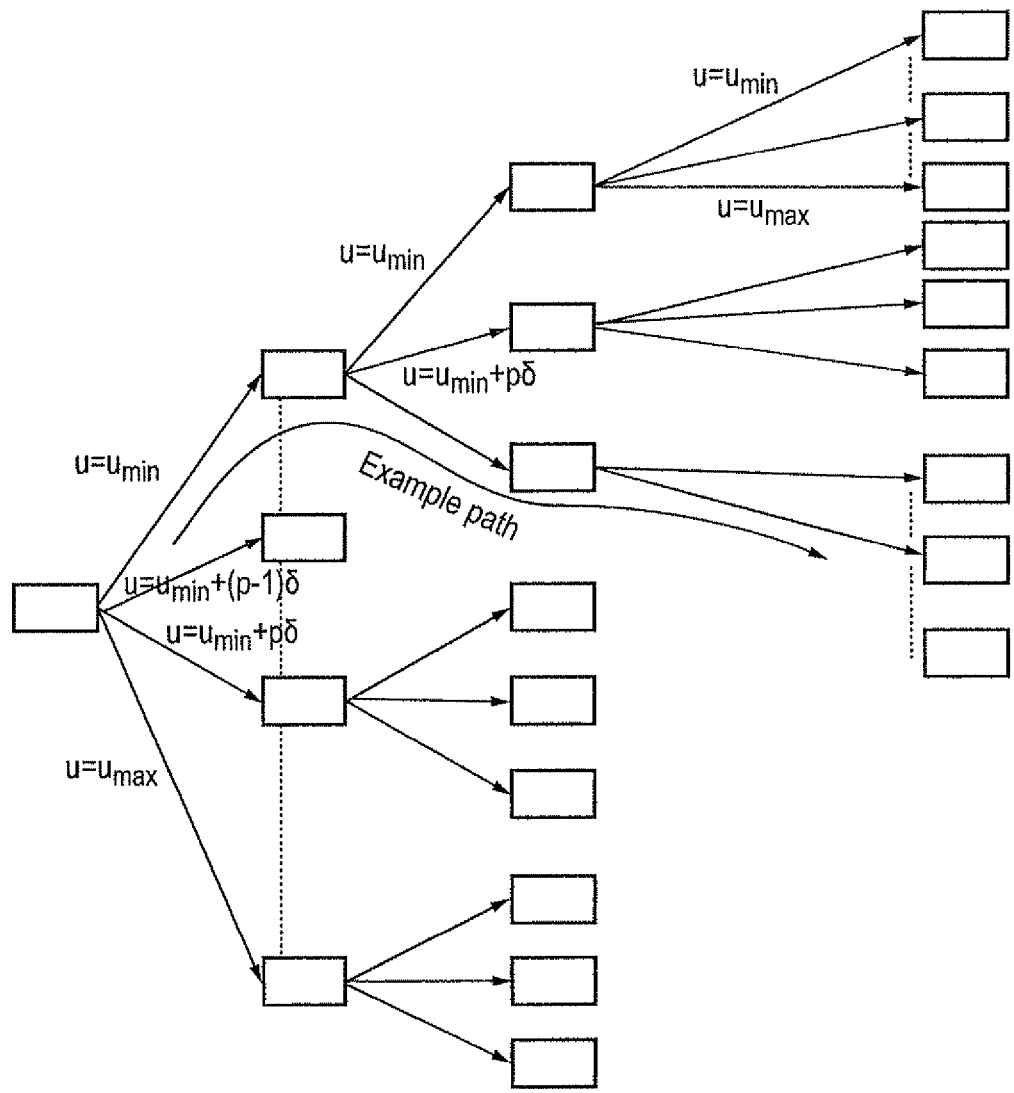
FIG. 3 shows schematically a tree structure illustrating the computation of values of possible future performance variables.

This leads to a tree structure, as shown schematically in FIG. 3, of possible moves as we compute all possible combinations of all moves into the future.

Starting from time k at the left hand side of the graph, we compute all possible future outputs with respect to future inputs:

$$\{y(k+1|k)\} = M \circ \{u_{min}, u_{min}+\delta, u_{min}+2\delta \ldots u_{min}+p\delta \ldots u_{max}-2\delta, u_{max}-\delta, u_{max}\}$$

Each of the possible moves corresponds to an edge on the tree and each has a cost associated with it given by F, so that for the edge corresponding to input $u_{min}+p\delta$, the associated cost is $F(u_{min}+p\delta, M \circ (u_{min}+p\delta))$.

The same procedure is repeated N time steps into the future, although some branches of the tree may not be computed if the performance variables y computed for a particular edge would conflict with an operational constraint.

Each path from one side of the tree structure to the other represents a possible value for the cost function J. The task is to find the path which minimises J.

There are several deterministic graph theoretical algorithms known to the skilled person which can be applied to solve this problem. For example, Dijkstra's minimum cost algorithm can be used.

Figure 4:
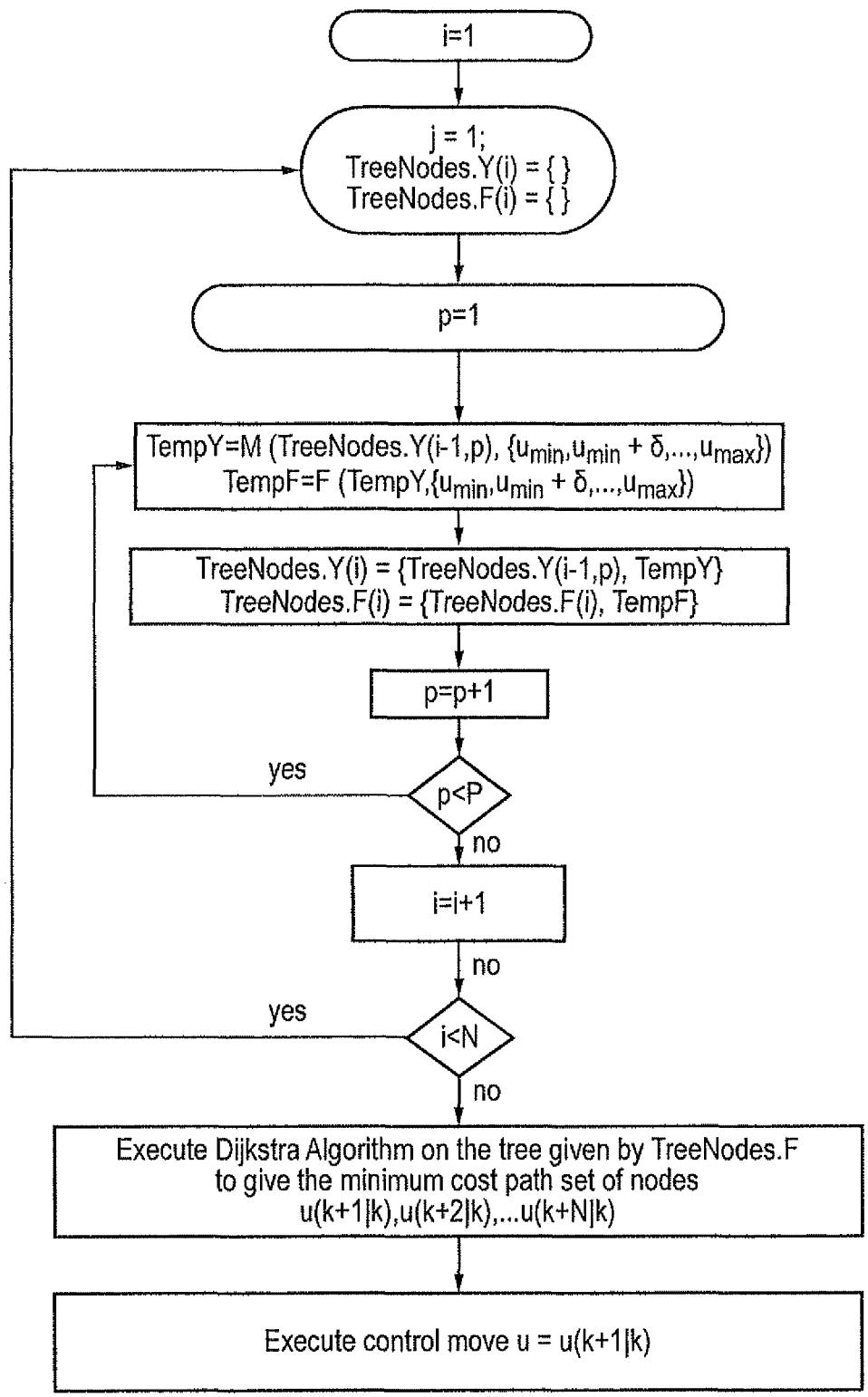
FIG. 4 shows a procedure, in the form of a flow chart, for selecting and executing a control move.

FIG. 4 shows the overall procedure in the form of a flow chart, P being the number of discrete values of u.

Figure 5:
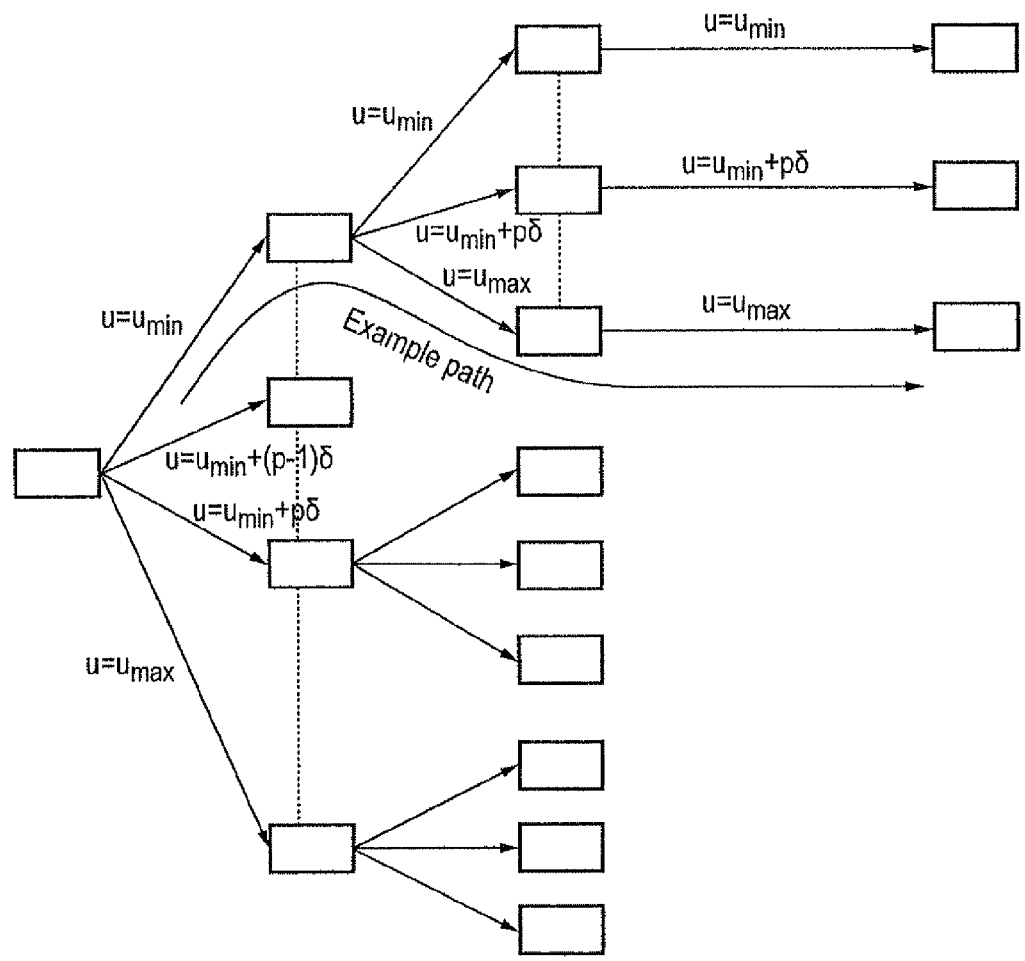
FIG. 5 shows a modified tree structure having a control horizon which is less than the prediction horizon.

The length of the prediction horizon characterised by N depends on the length of the time increments. For a lag dominant stable system, a time increment can be chosen to give a sampling rate that is, for example, 5-10 times faster than the dominant time constant of the system (i.e. the slowest time constant in the system). N can then be chosen, for example, to be in the range from about 20-40 to give a prediction horizon of similar duration to the settling time of the system. However, to reduce the computational burden, a relatively short control horizon, can be adopted (e.g. 2-5 control moves). That is, as shown in the modified tree structure of FIG. 5 having a control horizon of 2, all possible combinations of all moves are computed for the first two time increments into the future. Thereafter, for the remaining time increments up to N, there is no further branching of the tree structure and on each branch u keeps the value that it took at the second time increment, i.e. u(k+1|2).

The discretization of the allowable control moves $u \in [u_{min}, u_{max}]$ is highly system dependent. For example, a bleed valve which can be only open or closed such that u=0 or 1 is straightforward, but other systems may require analysis to determine suitable values of $\delta$ for the control variables.

Advantageously, the predictive control strategy can guarantee performance of control execution in a finite and predeterminable time frame. The strategy does not need to contain any approximations and can therefore gives an optimal solution for any choice of cost function.

Although discussed above in relation to control of gas turbine engines, the proposed invention is applicable to the control of many types of system, and particularly safety critical applications where a guaranteed performance is required.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

All references referred to above are hereby incorporated by reference.

The invention claimed is:

1. A method of controlling a gas turbine engine, the method comprising the steps of:
   (a) providing a model M of the gas turbine engine which is in explicit form and which predicts one or more gas turbine engine performance variables y from one or more gas turbine engine control variables u, such that y(k+1|k)=M u(k+1|k), where k is the present time, and k+1 is the time in the future after the passage of a time increment of predetermined length;
   (b) at time k, measuring or estimating the present values of the performance variables y, and then using a deterministic algorithm to optimise a cost function:

$$J = \sum_{i=1}^{N} F(u(k+i|k), y(k+i|k)),$$

where:
   N is selected such that the cost function J is convergent,
   k+i is the time in the future after the passage of i of the time increments,
   u(k+i|k) and y(k+i|k) are restricted in the cost function J to values of the respective control variables u and performance variables y which are compatible with predetermined gas turbine engine operational constraints, and
   for each time increment i=1 . . . N, values for F(u(k+i|k), y(k+i|k)) are calculated using the gas turbine engine model M to determine y(k+i|k) for a plurality of respective discrete values of u(k+i|k), the discrete values being limited to and representatively sampling the range of possible values of u which are compatible with the predetermined gas turbine engine operational constraints, the cost function J being optimised by identifying the combination {u(k+1|k),u(k+2|k), . . . u(k+N|k)} of respective discrete values u(k+i|k) over the N time increments which combination yields an optimised value for J;
   (c) selecting values for the control variables u which correspond to u(k+1|k) in the identified combination {u(k+1|k),u(k+2|k), . . . u(k+N|k)};
   (d) at time k+1, controlling the gas turbine engine with the selected values for the control variables u; and
   (e) repeatedly performing steps (b) to (d), time k+1 becoming the new time k after each performance of step (d).

2. A method according to claim 1, wherein, at step (b), the deterministic algorithm is the Dijkstra algorithm.

3. A controller for controlling a gas turbine engine, the controller being arranged to perform the steps of:
   (a) providing a model M of the gas turbine engine which is in explicit form and which predicts one or more gas turbine engine performance variables y from one or more gas turbine engine control variables u, such that y(k+1|k)=M u(k+1|k), where k is the present time, and k+1 is the time in the future after the passage of a time increment of predetermined length;
   (b) receiving measurements of or estimating, at time k, the present values of the performance variables y, and then using a deterministic algorithm to optimise a cost function:

$$J = \sum_{i=1}^{N} F(u(k+i|k), y(k+i|k)),$$

where:
N is selected such that the cost function J is convergent,
k+i is the time in the future after the passage of i of the time increments,
u(k+i|k) and y(k+i|k) are restricted in the cost function J to values of the respective control variables u and performance variables y which are compatible with predetermined gas turbine engine operational constraints, and
for each time increment i=1 ... N, values for F(u(k+i|k), y(k+i|k)) are calculated using the gas turbine engine model M to determine y(k+i|k) for a plurality of respective discrete values of u(k+i|k), the discrete values being limited to and representatively sampling the range of possible values of u which are compatible with the predetermined gas turbine engine operational constraints, the cost function J being optimised by identifying the combination {u(k+1|k),u(k+2|k), ... u(k+N|k)} of respective discrete values u(k+i|k) over the N time increments which combination yields an optimised value for J;
(c) selecting values for the control variables u which correspond to u(k+1|k) in the identified combination {u(k+1|k),u(k+2|k), ... u(k+N|k)};
(d) at time k+1, controlling the gas turbine engine with the selected values for the control variables u; and
(e) repeatedly performing steps (b) to (d), time k+1 becoming the new time k after each performance of step (d).

4. A controller according to claim 3, wherein, at step (b), the deterministic algorithm is the Dijkstra algorithm.

5. A controller according to claim 3 which is an engine electronic controller.

6. A gas turbine engine having an engine electronic controller according to claim 5.

7. A controller according to claim 3, wherein:
the gas turbine engine performance variable y is a spool speed of a turbine; and
the gas turbine engine control variable u is an amount of fuel.

8. A controller according to claim 3, wherein:
the gas turbine engine performance variable y is a blade tip clearance; and
the gas turbine engine control variable u is a cooling air valve opening angle.

9. A controller according to claim 3, wherein:
the gas turbine engine performance variable y is selected from the group consisting of compressor surge margin estimates, tip clearances, temperatures, pressures, and mass flows; and
the gas turbine engine control variable u is selected from the group consisting of variable stator vane actuator demands, turbine case cooling valve demands, bleed valve demands, and fuel flow demands.

10. A method of controlling a gas turbine engine, the method comprising the steps of:
(a) providing a gas turbine engine model M which is in explicit form and which predicts one or more gas turbine engine performance variables y selected from the group consisting of compressor surge margin estimates, tip clearances, temperatures, pressures, and mass flows such that the engine performance variable y is predicted using one or more gas turbine engine control variables u selected from the group consisting of variable stator vane actuator demands, turbine case cooling valve demands, bleed valve demands, and fuel flow demands, such that y(k+1|k)=M u(k+1|k), where k is the present time, and k+1 is the time in the future after the passage of a time increment of predetermined length;
(b) at time k, measuring or estimating the present values of the performance variables y, and then using a deterministic algorithm to optimise a cost function:

$$J = \sum_{i=1}^{N} F(u(k+i|k), y(k+i|k)),$$

where:
N is selected such that the cost function J is convergent,
k+i is the time in the future after the passage of i of the time increments,
u(k+i|k) and y(k+i|k) are restricted in the cost function J to values of the respective control variables u and performance variables y which are compatible with predetermined gas turbine engine operational constraints, and
for each time increment i=1 ... N, values for F(u(k+i|k), y(k+i|k)) are calculated using the gas turbine engine model M to determine y(k+i|k) for a plurality of respective discrete values of u(k+i|k), the discrete values being limited to and representatively sampling the range of possible values of u which are compatible with the predetermined gas turbine engine operational constraints, the cost function J being optimised by identifying the combination {u(k+1|k),u(k+2|k), ... u(k+N|k)} of respective discrete values u(k+i|k) over the N time increments which combination yields an optimised value for J;
(c) selecting values for the control variables u which correspond to u(k+1|k) in the identified combination {u(k+1|k),u(k+2|k), ... u(k+N|k)};
(d) at time k+1, controlling the gas turbine engine with the selected values for the control variables u; and
(e) repeatedly performing steps (b) to (d), time k+1 becoming the new time k after each performance of step (d).

11. A method according to claim 10, wherein:
the gas turbine engine performance variable y is a spool speed of a turbine; and
the gas turbine engine control variable u is an amount of fuel.

12. A method according to claim 10, wherein:
the gas turbine engine performance variable y is a blade tip clearance; and
the gas turbine engine control variable u is a cooling air valve opening angle.

* * * * *